May 16, 1961 J. A. VAN DEN BROEK 2,984,166
CAMERA WINDING MECHANISM
Original Filed May 23, 1958 4 Sheets-Sheet 1
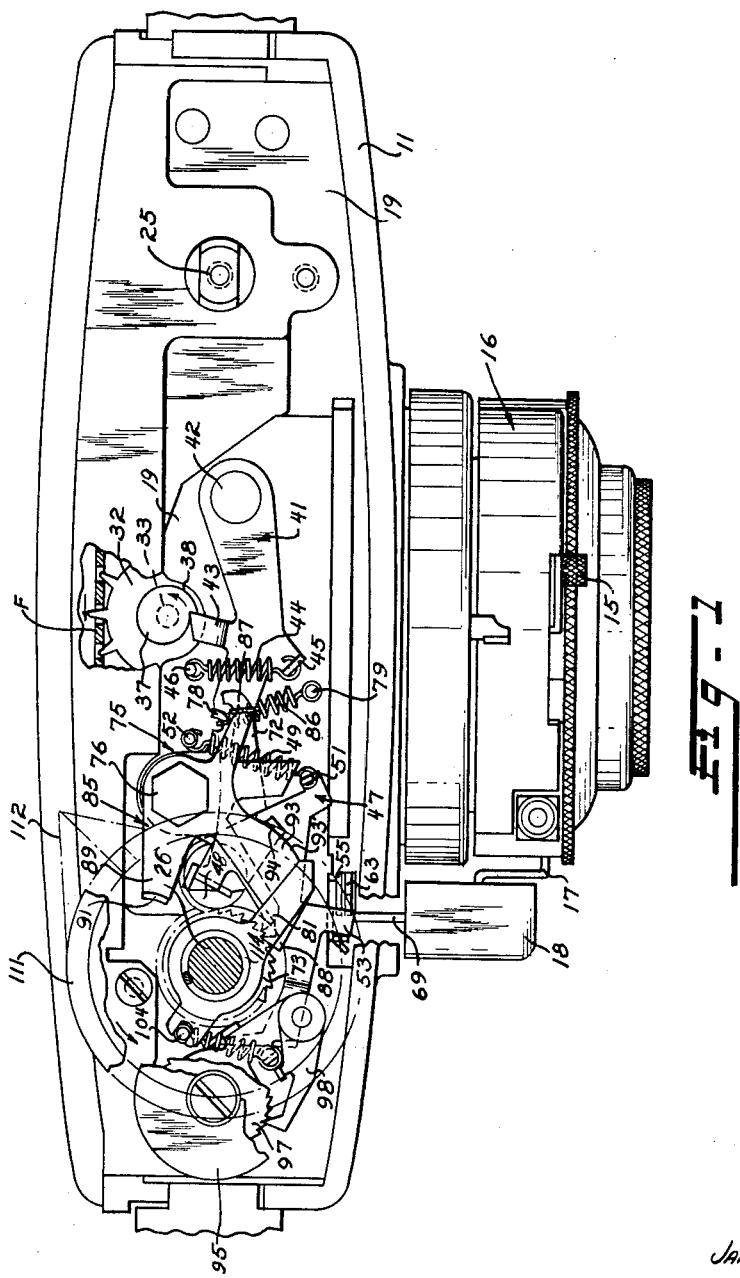
INVENTOR
JAN A. VAN den BROEK
BY *Strauch, Nolan + Neale*
ATTORNEYS May 16, 1961  J. A. VAN DEN BROEK  2,984,166
CAMERA WINDING MECHANISM
Original Filed May 23, 1958  4 Sheets-Sheet 2
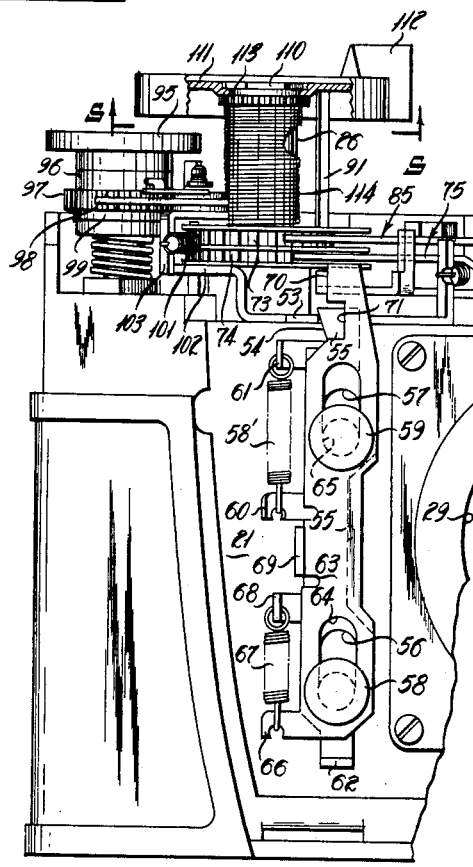
INVENTOR
JAN A. VAN DEN BROEK
BY Strauch, Nolan & Neale
ATTORNEYS May 16, 1961  J. A. VAN DEN BROEK  2,984,166
CAMERA WINDING MECHANISM
Original Filed May 23, 1958  4 Sheets-Sheet 3
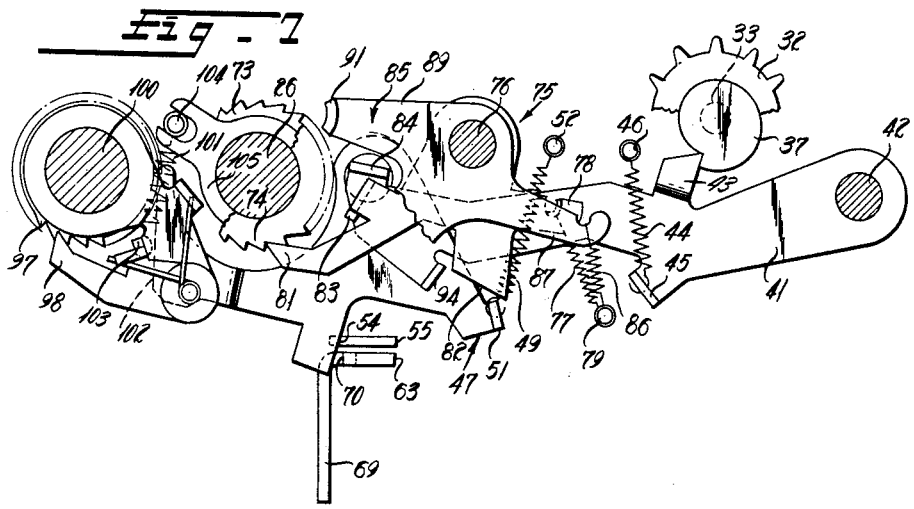
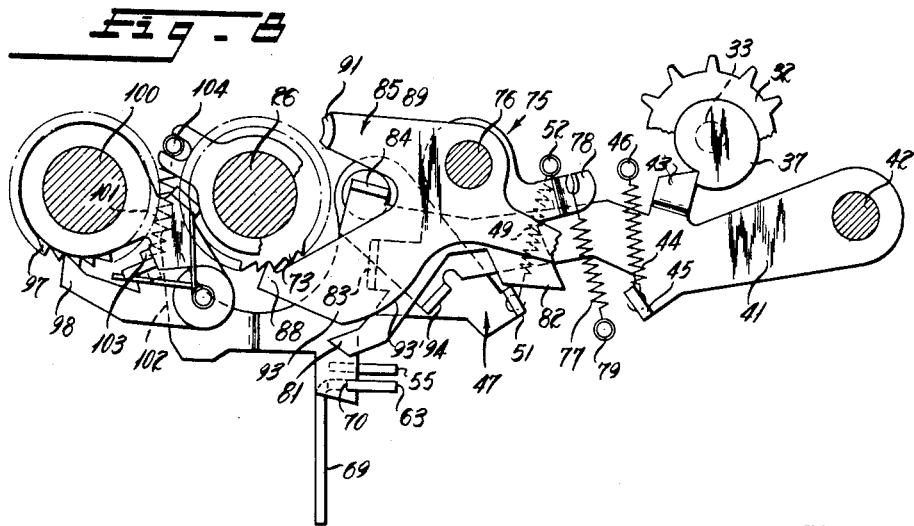
INVENTOR
Jan A. Van den Broek
BY *Strauch, Nolan & Neale*
ATTORNEYS May 16, 1961 J. A. VAN DEN BROEK 2,984,166
CAMERA WINDING MECHANISM
Original Filed May 23, 1958 4 Sheets-Sheet 4
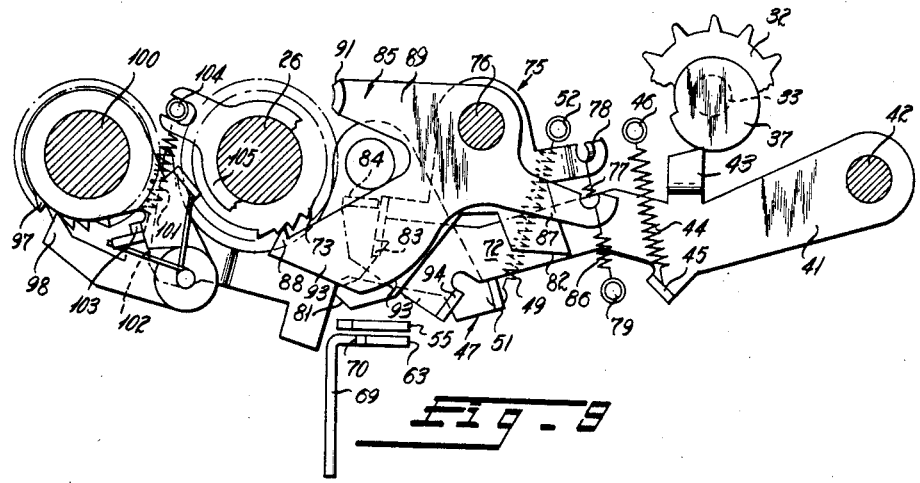
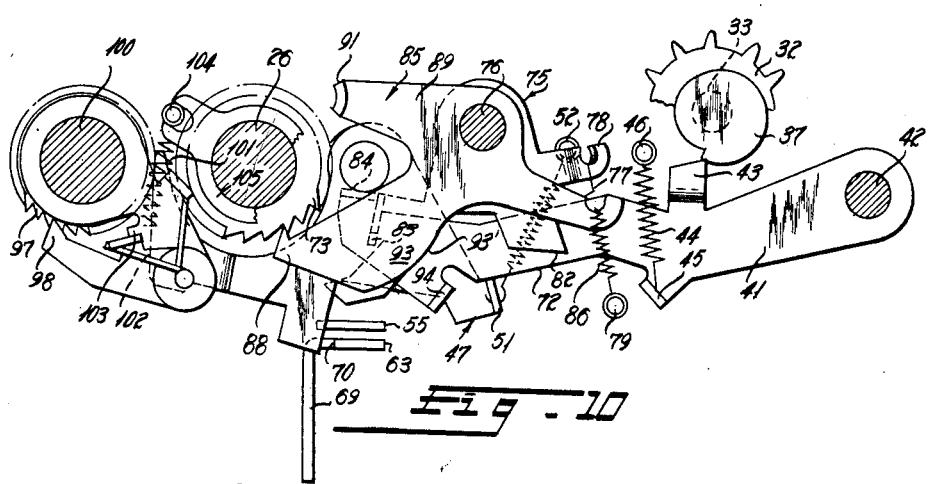
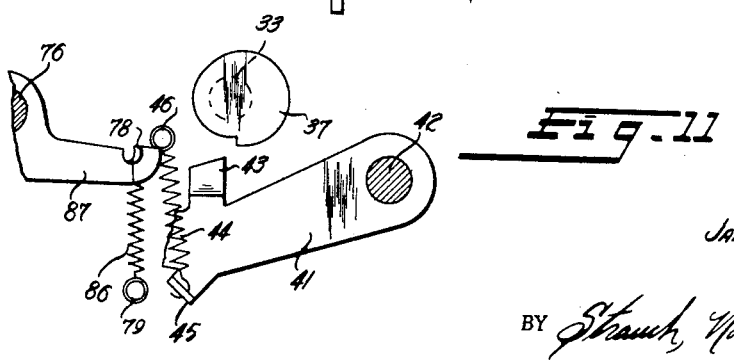
INVENTOR
JAN A. VAN DEN BROEK
BY Strauch, Nolan & Neale
ATTORNEYS

United States Patent Office 2,984,166
Patented May 16, 1961

2,984,166
CAMERA WINDING MECHANISM

Jan A. Van den Broek, Ann Arbor, Mich., assignor, by mesne assignments, to Sylvania Electric Products Inc., Wilmington, Del., a corporation of Delaware Original application May 23, 1958, Ser. No. 737,343. Divided and this application Jan. 12, 1959, Ser. No. 786,153

6 Claims. (Cl. 95—31)

This invention (a division of U.S. application Serial No. 737,343, filed May 23, 1958) relates to cameras and is particularly concerned with film wind and rewind control mechanism for cameras.

It is the major object of the present invention to provide mechanism for the rapid winding of film in a camera after each exposure, and wherein the film winding control and shutter actuating mechanism are interrelated in a special manner to prevent undesired double exposures and also to prevent wasting unexposed film areas in the event the operator forgets whether he has advanced the film after making an exposure.

A further object of the invention is to provide a novel shutter and rapid film wind interlock.

It is a further object of the invention to provide a shutter and film wind interlock having a novel arrangement for rewinding exposed film.

Further objects of the invention will appear as the description proceeds in connection with the appended claims and the annexed drawings wherein:

Figure 1 is a top plan view of a camera broken away in parts and sectioned illustrating a preferred embodiment of the invention with the manual lever for rapid wind removed to show parts therebelow;

Figure 2 is an enlarged fragmentary front elevation of part of the camera body broken away to show details of the exposure and film wind control mechanism;

Figures 3 and 4 are fragmentary views showing different positions of the shutter controls of Figure 2;

Figures 5 and 6 are bottom views essentially in section on line 5—5 of Figure 2 illustrating different positions of the manual rapid wind lever that is turned by the operator;

Figures 7, 8, 9 and 10 illustrate different operative positions of the exposure and film wind control mechanism during different periods of operation of the camera; and Figure 11 is a fragmentary view showing the release lever separated from the film driven cam for rewind.

Figure 12 is a fragmentary top view of the structure shown in Figure 2.

Referring to Figure 1, the camera comprises a body 11 having a top section that has been removed for purposes of illustration of the invention. A conventional shutter and lens assembly 16 is mounted on the front wall of body 11, this preferably being the usual Compur type assembly wherein the shutter is disposed between front and rear lens elements, cocked by one lever 15 and tripped by a laterally projecting separate shutter lever 17 having a manual button 18 on its outer end. Downward displacement of button 18 causes an exposure making operation of the shutter, and the button is spring returned after release by the operator as will appear.

The top wall of the main body section 11 is recessed at 19 to receive part of the exposure control mechanism, and the front wall of the body molding is recessed at 21 to receive associated exposure control mechanism as will appear. At the front of the camera an exposure aperture 29 is provided through which light comes from the lens assembly to expose the film F passing between the supply and take-up spindles.

The aperture 29 is centered in the camera, and a toothed sprocket wheel 32 mounted on a shaft 33 freely rotatable upon an axis which is perpendicular to the optical axis and perpendicular to the plane of the film F which drives it. The outer end of sprocket shaft 33 extends through the body and has non-rotatably fixed thereto a cam 37 which, as illustrated in Figure 1, has a surface 38 of constant lift the function of which will be later described in terms of its association with the exposure control mechanism.

Thus, as the film is drawn over the exposure aperture during which time it is held in a plane by the usual resilient film pressure plate on the camera back (not shown), it rotates the freely mounted sprocket 32 and thereby rotates the cam 37 through a predetermined angular amount every time the film is advanced the distance of one frame past the exposure aperture, this being independent of the amount of film on either spool.

A release lever 41 is mounted within recess 19 for free rotation about a fixed pivot indicated at 42. This lever extends from right to left in Figure 1 and is formed with an upstanding lug 43 which functions as a follower for cam surface 38 against which it is constantly maintained by the pull of a coiled tension spring 44 which extends between an upstanding tab 45 on lever 41 and an anchor 46 on the camera body. Thus, referring to Figure 1, the release lever 41 is constantly biased in a clockwise direction to maintain contact with cam 37 and when the film is advanced in the direction of the arrow to locate an unexposed portion before the exposure aperture thereby rotating sprocket 32 and cam 37 in a counterclockwise direction. Such will cause counterclockwise rotation of release lever 41 about its pivot 42 against the force of spring 44 for a purpose to be described.

A latch lever 47 is rotatably mounted to turn in a plane below the plane of release lever 41 about a fixed pivot 48. A spring 49 extending between an upstanding lug 51 on latch 47 and an anchor 52 on the body constantly biases latch 47 to turn in a counterclockwise direction against the force of spring 49. Latch lever 47 is provided with a locking projection 53 which extends forwardly into recess 21 in the front wall of the camera.

Referring now to Figure 2, which like Figure 7 shows the parts in the position they occupy after the film has been advanced one frame and is ready for an exposure making operation, latch lever 47 is held in its displaced non-latching position by the fact that locking projection 53 engages the edge face 54 of a rear slider bar 55 which is slidably mounted by means of elongated slots 56 and 57 on fixed studs 58 and 59 for reciprocal displacement in a plane perpendicular to the plane of swing of latch 47. A coiled tension spring 58' extending between tab 60 on bar 55 and an anchor 61 on the body constantly urges slider bar 55 upwardly in Figure 2. The lower end of bar 55 is bent at right angles forwardly out of the plane of Figure 2 to provide a foot 62 for a purpose to be described.

A front slider bar 63 is superposed above slider bar 55 for parallel reciprocal displacement, being formed with elongated slots 64 and 65 coacting with studs 58 and 59 and a lower tab 66 connected by coiled tension spring 67 to a fixed anchor 68 on the body. Spring 67 constantly urges front slider bar 63 upwardly to its Figure 2 position. An integral lug 69 projects forwardly from front slider bar 63 and at its outer end has fixedly mounted thereon the manual button 18 which is operably connected to shutter lever 17. The foot 62 at the lower end of bar 55 lies in the path of the lower end of bar 63.

Thus when the operator pushes down on button 18 such displaces lever 17 to actuate the shutter to perform an exposure making operation and displaces slider bar 63 downwardly. At its upper end slider bar 63 is formed with a side edge notch 71 which under certain circumstances of operation to be described later is adapted to receive latch projection 53 to prevent downward displacement of slider bar 63 by the operator pushing on button 18 and thereby prevent actuation of the shutter. Above notch 71 is an edge face 70 also adapted to coact with the latch as will appear.

Figures 4 and 8 illustrate the parts in the position they assume after the shutter has been tripped and ready for the operator to advance the film. Cam 37 is rotated counterclockwise by rotation of sprocket 32 during advance of the film toward the take-up spool and release lever 41 is thereby rocked counterclockwise due to sliding contact of follower lug 43 with the cam. This first brings edge face 72 of lever 41 into contact with lug 51 of the latch lever 47 (see Figure 9), and further counterclockwise rocking of lever 41 with edge face 72 in sliding contact with lug 51 results in a clockwise rocking of latch lever 47 about its pivot 48 which removes latch projection 53 from notch 71 and out of the path of rear slider bar 55. As soon as projection 53 clears bar 55, spring 58' shifts rear slider bar 55 upwardly to its Figure 2 position and this takes place before the cam has rotated a complete revolution.

After cam 37 has been rotated a complete revolution, lug 43 drops from the high point of surface 38 shown in Figure 10 to the low point position of Figure 1, thereby permitting release lever 41 to rock back to its Figure 1 position under the pull of spring 44 and freeing latch lever 47 to be rocked back counterclockwise under the influence of spring 49. However, by this time slider bar 55 is so disposed as in Figure 2 that its edge face 54 is in the path of latch projection 53 and this holds the latch 47 in its rocked Figure 1 position.

Within body recess 19 take-up spindle 26 which is freely rotatably mounted in the camera body has fixed thereon two oppositely toothed ratchet discs 73 and 74. A wind pawl 75 is mounted for free rocking on a fixed pivot 76 within the recess 19 above the planes of levers 41 and 47 about an axis parallel to spindle 26. A coiled tension spring 77 extending between a tab 78 on pawl 75 and an anchor post 79 on the camera body normally urges pawl 75 clockwise to tend to engage pawl tooth 81 with the teeth of the lower ratchet disc 74 as illustrated in Figure 7.

However, when the parts are in the above described Figure 4 and 8 position, wind pawl 75 is held rocked counterclockwise so that tooth 81 is disengaged from the ratchet disc 74, by reason of engagement of face 82 of the wind pawl with lug 51 of the latch lever.

During the above-described rotation of cam 37 by film advance, starting with the parts in Figure 8 position, lug 51 moves away from pawl face 82 as soon as the latch lever 47 starts to rock clockwise, but pawl 75 which would otherwise be free to rock clockwise to engage ratchet disc 74 has a downturned lug 83 which is now engaged by an upturned lug 84 on the end of release lever 41 which now assumes control of the wind pawl 75 and holds the wind pawl out of engagement with ratchet disc 74 until the film winding operation to advance the film one frame is completed. Then the clockwise return of release lever 41 to its initial position of Figures 1 and 8 disengages lug 83 from the wind pawl and permits spring 77 to rock the wind pawl into toothed engagement with the ratchet disc 74 as illustrated in Figure 7. This locks the spindle 26 to prevent further winding of knob 14 and thus limits the film advance to one frame.

After the film advance movement has been completed, the shutter is cocked through the usual separate cocking lever 15, which has no connection with the mechanism in recesses 19 and 21 and the camera is now ready for an exposure by displacing button 18 downward. At this time the slider bars 55 and 63 and the latch lever are related as in Figure 2.

When button 18 is pushed downwardly to actuate shutter lever 17, bar 63 engages foot 62 of the rear slider bar 55 and displaces bar 55 downward until face 54 is removed from the path of latch projection 53. Now latch 47 tends to rock back counterclockwise under the pull of spring 49, but as long as front slider bar 63 is in its lower position its edge face 70 will block such counterclockwise swinging of the latch lever, a transient condition of the parts illustrated in Figure 3. The relative locations of edge faces 54 and 70 and the proportions of the slider bars are such that edge face 70 moves into the path of latch projection 53 before edge face 54 is removed out of the path of latch projection 53. Also since face 70 is slightly displaced laterally of face 54 it will be observed that projection 53 in its Figure 3 position engaging face 70 now extends over the top of rear slider bar 55.

Thus the spindle 26 is maintained against rotation during the entire shutter actuating operation. However, when the operator releases button 18, this permits spring 67 to pull front slider bar 63 upwardly and at the same time spring 58' tends to pull rear slider bar 55 upwardly. As soon as blocking face 70 rises above latch projection 53, the spring biased latch 47 now is permitted by notch 71 to swing counterclockwise to its Figure 4 and 8 position to coact with the mechanism in recess 19 as above explained but latch projection 53, as shown in Figure 4, remains in the path of the top of rear slider bar 55 to prevent its upward displacement by spring 58'. In this position of the parts, the shutter cannot be actuated, due to the latching engagement of projection 53 in notch 71, until the film has been advanced as above described to swing latch lever 47 to its Figure 2 position. Thus unintentional double exposures are prevented.

Above the plane of wind pawl 75, a rewind pawl 85 is mounted for free rocking about pivot 76, and a coiled tension spring 86 acting between arm 87 of the rewind pawl and anchor post 79 constantly urges pawl 85 clockwise (Figure 1) to engage tooth 88 with upper ratchet disc 73 on take-up spindle 26. Pawl 85 has an operating arm 89 which projects toward the wind spindle. As shown in Figures 1 and 2 arm 89 is bent upwardly at right angles at its end to provide an arm 91 that extends adjacent and parallel to spindle 26, for a purpose to appear.

During all normal operation of the camera, pawl 85 is resiliently maintained engaged with ratchet disc 73 to permit only unidirectional counterclockwise rotation of take-up spindle 26 even when wind pawl 75 is disengaged from ratchet disc 74. When, however, it is desired to rewind the film on the supply spool connected to spindle 25 the arm 89 is operated to rock pawl 85 counterclockwise to swing tooth 88 away from the ratchet disc 73. During this movement, the curved surface 93' of arm 93 of pawl 85 engages an upturned lug 94 on release lever 41 and rocks lever 41 counterclockwise to remove lug 43 from engagement with cam 37 and, if wind pawl 75 should be in toothed engagement with ratchet disc 74 at the time, engagement of lug 84 with the wind pawl lug 83 will swing wind pawl 75 also out of toothed engagement with ratchet disc 74, and spindle 26 will now be free to rotate under the pull of the film being rewound on the spool on spindle 25. The rocking of lever 41 counterclockwise by pawl 85 results in clockwise rocking of latch 47, by engagement of face 72 and lug 52, whereby the slide bars in recess 21 are unlatched to permit an intentional double exposure. It will be observed that the action of pawl 85 in rocking lever 41 until follower lug 43 is out of the path of the cam 37 permits free reverse rotation of the sprocket and cam assembly by the rewound film. Pawl 85 is spring returned to its normal Figure 1 position when released by the operator.

Rotatably mounted upon the upper end of spindle 26, as on the shank of bolt 110, is a rapid wind lever 111 which is essentially in the form of a knob having a radial thumb-engaging projection 112. Below lever 111 a ratchet toothed disc 113 is non-rotatably mounted on spindle 26 and trapped there by lever 111. A coil spring 114 surrounds the cylindrical surface of spindle 26 and has its lower end anchored on the camera body. The other end of spring 114, see Figures 5 and 6, extends into and is anchored in an aperture 115 centered in the pivot pin 116 by which a pawl 117 is mounted within the recessed bottom of lever 111. The tooth 118 at the tip of pawl 117 is resiliently urged into engagement with the teeth of ratchet 113 by a hairpin type compression spring 119 mounted on a rivet 121 and having one leg 122 bearing on the lever and the other leg 123 bearing against pawl 117. On the side opposite tooth 118 the pawl is formed with a slide surface 124 bearing against arm 91 of rewind pawl 85.

When the rapid wind lever 111 is rotated in the direction shown in the direction of the arrow in Figure 1, which corresponds to rotation of lever 111 in the direction of the arrow in Figure 5, the spindle 26 is rotated by engagement of the pawl tooth 118 and ratchet 113 to advance the film. The stroke of the lever 111 is limited to just over 180° by abutment of pawl 117 with arm 91 as shown in Figure 6, and when the operator releases the lever 111 the spring 114 quickly returns it to the Figure 5 position. Then the operator again rotates 111 in the direction of the arrow and during this period advance of sufficient film before the exposure aperture is completed and the spindle 26 is locked by wind pawl 75 as above explained.

The lever 111 has another function in addition to rapid winding actuation of the take-up spindle 26. This function is to release the spindle 26 for rewind of the film back on the take-up spool at 25 or for intentional double exposures. This is accomplished by rotating lever 111 through only a few degrees in the direction of the dotted line arrows of Figures 5 and 12. The resultant abutment of pawl 117 on arm 91 causes the above-described counterclockwise rocking of rewind pawl 85 to declutch tooth 88 from ratchet disc 73 and otherwise free spindle 26 for free rotation upon pull of the film toward the supply spindle 25.

Spindle 26 is conventionally formed and connected within the camera body to drive the wind spool, usually through a friction clutch mechanism (not shown).

A counter dial 95 visible through the top of the camera is mounted on a rotatable supporting shaft through the usual friction clutch indicated at 96 and it is rotated by means of a ratchet disc 97 engaged by a spring biased pawl 98. Pawl 98 is pivotally mounted on a carrier 99 which is in turn pivotally mounted to rock about the axis of the counter shaft but is normally pulled counterclockwise by a coiled tension spring 101 anchored on body pin 104. The carrier is caused to rock clockwise about the axis of the counter shaft 100 every time a film advancing operation is effected, the actual displacement of carrier 99 being effected by an integral nose 102 on latch lever 47 in slidable contact with a downturned lug 103 (Figure 2) on carrier 99, when the latch lever 47 is being moved clockwise by the release lever as above explained. Latch lever nose 102 serves as a stop against counterclockwise rocking of carrier 99 by spring 101. Pawl 98, when the carrier is thus rocked clockwise, turns ratchet disc 97 and the dial clockwise. When the latch lever moves in the opposite direction, spring 101 effects return rocking of the carrier, pawl 98 merely ratcheting over disc 97 at the time.

A plurality of spacer elements 105, 106 and 107 are provided about the spindle 26 as illustrated to maintain planar swinging of pawls 75 and 85 and these are anchored against rotation by slotted end engagement with anchor 104.

We have therefore provided a camera in which double exposures and undue waste of film are avoided through a novel film wind and shutter interlock. Double or multiple exposures may be deliberately made by manipulation of rewind pawl 85.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having an exposure aperture and a shutter control mechanism, a rotatably mounted film wind spindle, a shiftable rapid wind lever unidirectionally drive connected to said spindle so that when said lever is shifted in one direction said spindle is rotated to advance film across said aperture after each exposure, locking mechanism operative upon movemet of a predetermined length of film past said aperture to arrest said spindle against said rotation, latch means for said shutter control mechanism, and means effective upon movement of said lever in a direction other than that in which it drives said spindle for unlocking said locking mechanism and also unlatching said latch means.

2. In a camera having a wind spindle and a shutter, control mechanism interlocked between the spindle and shutter for preventing two successive exposure making actuations of the shutter without an intermediate advance of a predetermined length of film and for preventing advance of more than said predetermined length of film after each shutter actuation, said mechanism comprising a pivoted release lever rocked in response to film advance, a pivoted spring biased wind pawl adapted to be contacted by said release lever and moved into locking engagement with said spindle and a pivoted latch lever operatively associated with said wind pawl and shutter actuating means operatively connected to said latch lever, and a rapid wind lever mounted for unidirectional drive connection to said spindle when moved in one direction and effective when moved in another direction to actuate said release and latch levers to unlock said spindle and free said shutter actuating mechanism.

3. In a camera defined in claim 2, said rapid wind lever being rotatably mounted on said spindle.

4. In a camera having a rotatable film wind spindle and a shutter, control mechanism interlocked between the spindle and shutter for preventing two successive exposure making actuations of the shutter without an intermediate advance of a predetermined length of film and for preventing advance of more than said predetermined length of film after each shutter actuation, said mechanism comprising a pivoted release lever operatively connected to a cam rotated in response to film advance, a pivoted spring biased wind pawl adapted to be contacted by said release lever and moved into locking engagement with said spindle, a pivoted latch lever operatively associated with said wind pawl and shutter actuating means operatively connected to said latch lever, and a rapid wind lever mounted for unidirectional drive connection to said spindle when moved in one direction and adapted when moved in another direction to shift said release lever out of connection with said cam and to shift said wind pawl out of engagement with said spindle.

5. In a camera defined in claim 4, said wind lever when moved in said other direction also causing said latch lever to free said shutter actuating means.

6. In a camera, a rotatable wind spindle, a film driven element, a cam rotated from said element, a pivoted exposure mechanism control lever spring biased into engagement with said cam, a pivoted rewind pawl spring biased toward engagement with said spindle to prevent rotation thereof in one direction, a pivoted wind pawl spring biased toward engagement with said spindle to prevent rotation thereof in the opposite direction, a pivoted latch lever, shutter actuating mechanism, spring means biasing said latch lever in one direction to dispose one portion thereof in locking association with said shutter actuating mechanism and another portion thereof in engagement with said wind pawl to hold the wind pawl disengaged from said spindle, means operatively connecting said control lever and latch lever during movement of the control lever by said cam from an initial position as the film is advanced to unlock said latch from said shutter actuating mechanism and disengage said latch from said wind pawl for spring biased return toward locking engagement with said spindle, said control lever being returned to initial position after a complete revolution of said cam, a rapid wind lever mounted to move in one direction to provide a unidirectional drive connection with said spindle, and means establishing a direct motion transmitting connection between said rapid wind lever and said rewind pawl when said rapid wind lever is moved in another direction.

References Cited in the file of this patent

UNITED STATES PATENTS

| | | |
|---|---|---|
| 2,063,330 | Nagel | Dec. 8, 1936 |
| 2,150,696 | Nelson | Mar. 14, 1939 |
| 2,559,880 | Kesel et al. | July 10, 1951 |
| 2,575,012 | Harvey | Nov. 13, 1951 |
| 2,721,506 | Kindig et al. | Oct. 25, 1955 |
| 2,880,661 | Kaden et al. | Apr. 7, 1959 |
| 2,892,392 | Harris et al. | June 30, 1959 |